Oct. 18, 1966  A. L. FREEDLANDER ET AL  3,278,955
FOAM RUBBER ARTICLE
Filed June 11, 1964  2 Sheets-Sheet 1

INVENTOR.
ABRAHAM L. FREEDLANDER
THOMAS TROGDON
BY
Reuben Wolk
ATTORNEY

Oct. 18, 1966   A. L. FREEDLANDER ET AL   3,278,955
FOAM RUBBER ARTICLE
Filed June 11, 1964   2 Sheets-Sheet 2
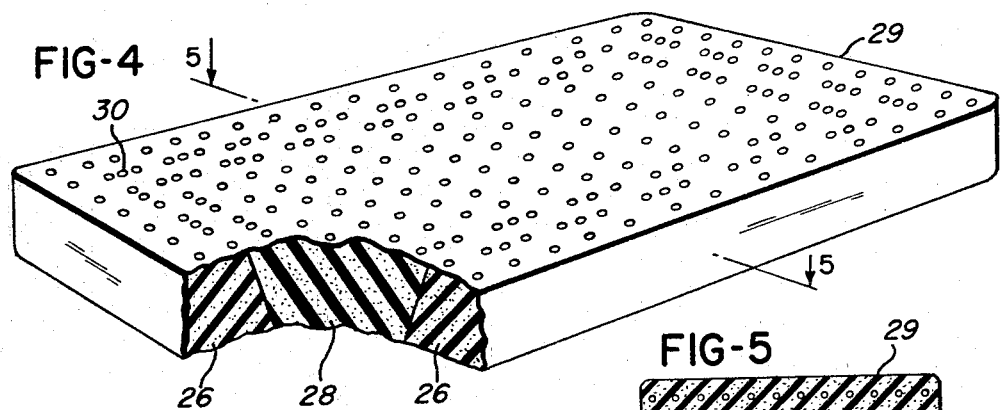
FIG-4
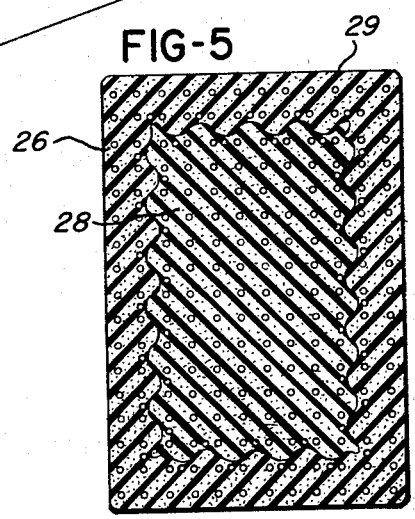
FIG-5
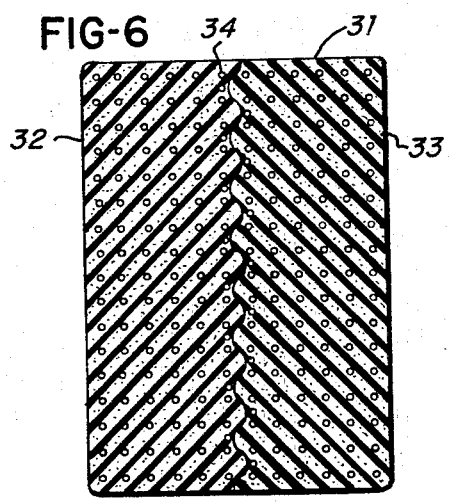
FIG-6
FIG-7
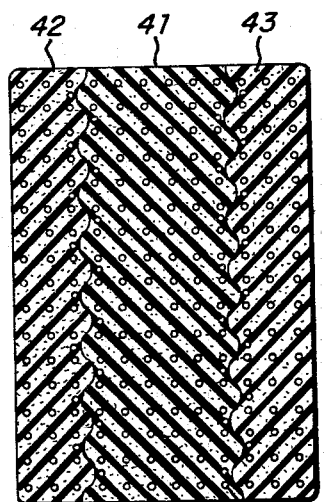
FIG-8
INVENTOR.
ABRAHAM L. FREEDLANDER
THOMAS TROGDON
BY
Reuben Wolk
ATTORNEY

United States Patent Office 3,278,955
Patented Oct. 18, 1966

3,278,955
FOAM RUBBER ARTICLE
Abraham L. Freedlander, Dayton, Ohio, and Thomas Trogdon, Waynesville, N.C., assignors to Dayco Corporation, Dayton, Ohio, a corporation of Ohio
Filed June 11, 1964, Ser. No. 374,514
10 Claims. (Cl. 5—361)

This invention relates to foam rubber articles, and more particularly to such articles which are molded from rubber latex foam. The articles referred to herein are normally utilized as mattresses, furniture cushions, pillows, automobile seat cushions, and the like.

Articles of the type described herein are manufactured by using metal molds having upper and lower mold members, the lower member having a cavity in which the mold is partially filled with a liquid rubber latex composition that has been compounded to permit foaming. The foamed material is subsequently coagulated and vulcanized as more fully described in United States Patent No. 2,432,353, and is commonly referred to as the Talalay process. The bottom surface of the lower mold member has a number of core pins mounted thereon which project into the mold cavity, and the upper mold member likewise has core pins which project inwardly. The application of liquid latex, closing of the mold, and ensuing steps will produce a product which will have a number of corings extending inwardly from both surfaces.

The above-described process provides a latex composition which is uniform in density so that the resultant product will also be uniform in density. There are many instances, however, where it is desirable to provide a product having dissimilar densities in various portions; this has been accomplished in some cases by fabricating two dissimilar members and cementing them together as in United States Patent No. 2,612,158. This method has proved unsatisfactory, however, because of the time, expense, and inconsistent product which results.

It is, therefore, a primary object of this invention to provide a foam rubber article which is unitary, yet contains materials of dissimilar densities in various portions thereof.

It is a further object of the invention to provide such an article which provides unitary strength equivalent to that of an article having material of the same density.

In practicing the present invention, various molds have been utilized in the conventional Talalay process having upper and lower members and containing core pins. In accordance with the present invention this basic apparatus may be used to produce the novel product by introducing two or more latices of dissimilar densities into various portions of the mold cavity. Since the latices have been compounded to be foamable, they will foam within respective portions of the cavity and maintain separate identity during the process. In order to promote the separation of identity, the conventional molds are modified so that certain of the core pins on each surface are increased in number to form a barrier to the flow of the latices from one portion to the other. This is done by reducing the spacing between certain adjacent core pins in selected rows. During the foaming and subsequent vulcanization the mating surfaces of the various portions will merge to form a unitary product.

While it is possible to utilize a single row or sets of rows having pins with reduced spacing to form a barrier, this will result in an essentially flat mating surface between the various portions. Such a surface creates an inherent weakness in the structure. The present invention avoids the use of a flat surface and provides that the mating surface be somewhat irregular; this strengthens the structure. It has been found, for example, that a generally sinusoidal plane between the contiguous mating surfaces of the various portions will create the added strength effect which is desired. This is achieved by creating two adjacent rows of pins in which certain pins have reduced spacing, these two rows defining the area in which the mating surfaces will be contiguous. Each of these adjacent rows has certain core pins which have normal spacing; that is, normal in the sense that they have the same spacing as the majority of the pins in the mold; while other pins in the same row are more closely spaced. By locating the more closely spaced core pins of one row opposite the normally spaced core pins of the adjacent row a path will be created for the flow of latex between the normally spaced pins and yet the more closely spaced pins will act as a barrier. By alternating the relationship between the opposed normal and close spacing of the rows the barrier will change and thus permit the latices to flow and create the sinusoidal planes referred to above. This in turn will result in a finished product which has corings that match the core pins so that the more closely spaced corings of one row will be opposite the normally spaced corings of the adjacent row in an alternating relationship. The peak of the sinusoidal planes therefore will be adjacent the closely spaced corings.

The method of manufacturing this product and the final configuration will be more fully described below. Also to be fully described are the variations which are possible in permitting the article to have an outer peripheral member dissimilar in density from the main portion of the member; two longitudinal halves which are dissimilar; or three longitudinal or transverse portions having at least two different densities. The invention will be more fully described in the following description and drawings, in which:

FIGURE 4 is a perspective view, partially broken, of a finished product manufactured in accordance with the present invention.

FIGURE 5 is a sectional view taken along lines 8—8 of FIGURE 4.

FIGURES 6, 7, and 8 are views similar to FIGURE 5 illustrating modified forms of the invention.

Figure 1:
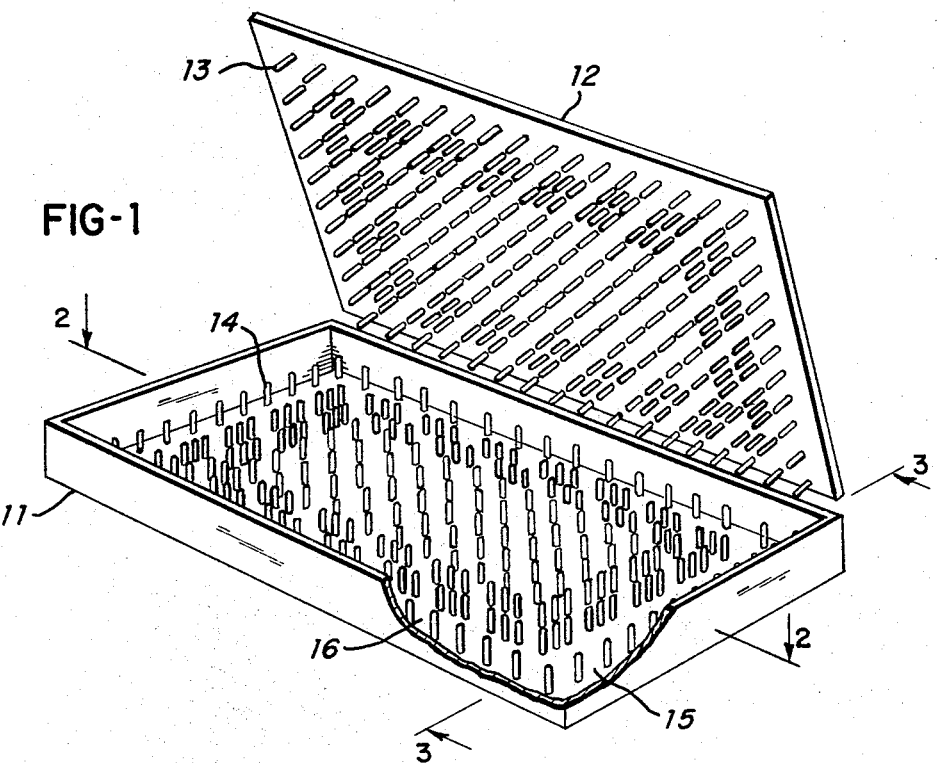
FIGURE 1 is a perspective view of a typical mold used in practicing the present invention.

Referring now to the drawings, FIGURE 1 illustrates a mold consisting of a lower mold member 11 and an upper mold member 12. The upper mold member has a number of core pins 13 mounted thereon, and the lower mold member 11 has a base 15 on which is mounted core pins 14. The upper mold member is adapted to close over the lower member in order to provide an enclosed mold during fabrication, defining a mold cavity 16.

Figure 2:
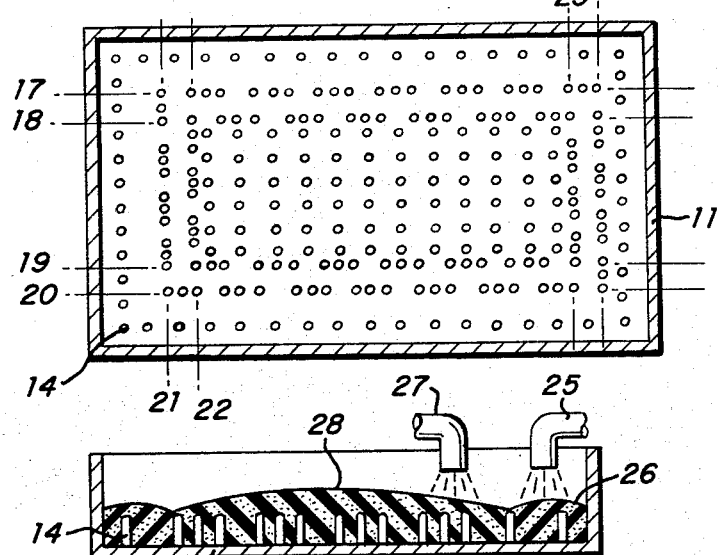
FIGURE 2 is a sectional view of a portion of the mold taken along lines 2—2 of FIGURE 1.

As better shown in FIGURE 2, the lower mold member 11 has its core pins mounted thereon in rows which are normally spaced equally apart as shown. An exception to the spacing pattern is found, however, in the rows designated as 17 and 18, which are adjacent rows parallel to and close to one longitudinal end of the mold; 19 and 20 which are adjacent rows parallel to and close to the other longitudinal edge of the mold; 21 and 22 which are adjacent rows parallel to and close to one transverse edge of the mold; and 23 and 24 which are adjacent rows parallel to and close to the other transverse edge of the mold. As seen in FIGURE 2, each of these rows contains additional pins which are more closely spaced than the normal spacing, alternating with normal spacing within the same row. This has been achieved by inserting an extra pin between each alternatively normally spaced pin in the row, and the result in each row is a group of three closely spaced pins, each of said groups separated by the normal spacing. In the adjacent row of each of these pairs the same spacing occurs except that the group of three pins in this row is opposite the normal spacing of the adjacent row. As stated above, the relationship of the closely spaced pins to the opposite normal spacing in the adjacent row is found between rows 17 and 18; 19 and 20; 21 and 22; and 23 and 24.

It should be further noted, particularly with reference to FIGURE 1, that the special barrier rows in the lower mold member 11 are spaced farther inward from the edges than are the barrier rows in the upper mold member 12. This conforms with the general relationship of the rows of core pins in the upper and lower mold members since it is desirable that the rows of pins do not directly coincide. Thus, any resultant product, as will be further described below, will contain corings in the upper surface which are not in alignment with the corings in the lower surface.

Figure 3:
FIGURE 3 is a sectional view taken along lines 3—3 of FIGURE 1 illustrating the mold and a first step in the process.

When it is desired to fabricate a product, nozzles are used to introduce liquid rubber latices into the transverse portions of the mold. As shown in FIGURE 3, nozzle 25 provides a latex 26 of a density (preferably about 0.35 grams per cubic centimeter) which provides a comparatively firm member. This latex is introduced into the outer peripheral portion of the mold cavity as shown. The nozzle 27 introduces latex 27 into the remaining portion of the mold cavity, which latex preferably has a density of about 0.2 grams per cubic centimeter to provide a comparatively soft foam material. The latices are separated by the pins which are closely spaced in the adjacent barrier rows (17 and 24) and are thus kept from flowing completely together and becoming intermingled. At the same time, however, there is sufficient space between the pins in these barrier rows so that the latices will partially flow and contact each other to form the final unitary product. As soon as the latices have been introduced, the mold is closed and the process described in the aforesaid Patent No. 2,432,353 will take place. The latices will foam into the typical stereoreticulate structure while maintaining distinct identities. As further processing continues, the foaming is completed and the finished product is subsequently vulcanized into a molded foam article having a comparatively firm peripheral edge.

The finished product is designated by reference numeral 29 in FIGURE 4 and consists of the peripheral portion 26 and the principal portion 28. As can be seen, the adjacent contiguous portions 26 and 28 have a mating surface which is sinusoidal. This sinusoidal effect has been created by the tendency of each of the latices to flow between the normally spaced pins of each barrier row but to be stopped by the barrier created by the group of closely spaced pins of the adjacent barrier row. This is clearly shown by the relationship between the corings 30 and the dissimilar portions of material shown in FIGURE 5. The finished product has a principal portion which as a density of approximately 0.06 grams per cubic centimeter, and a peripheral portion which is somewhat firmer having a density in the order of approximately 0.09 gram per cubic centimeter.

Instead of the member 29 having a peripheral reinforcing member that is firmer, it is possible instead to mold an article having other configurations. For example, FIGURE 6 illustrates a finished article 31 having two halves of dissimilar densities 32 and 33. As shown by the relationship between these longitudinal halves and the corings 34, this product has been fabricated by a similar process to that already described except that the two rows of adjacent corings illustrated were formed by similar rows of core pins mounted in the mold. The same relationship between the more closely spaced and the normally spaced pins exists except that the two adjacent rows were located longitudinally of the molds and centrally thereof. The resultant product is a unitary one in which the adjacent portions 32 and 33 have their mating surfaces contiguous along the sinusoidal plane which is illustrated.

FIGURE 7 illustrates a further form of the invention in which a molded article 35 consists of three transverse portions 36, 37, and 38. The central portion 37 has a higher density than the outer portions 36 and 38 so that a product, such as a mattress, is provided that is firmer in the central area to bear the maximum weight of the sleeper. This minimizes an tendency of the mattress to sag. As an alternative, of course, the end portions 36 and 38 may be dissimilar in density from each other so that the finished product may have three portions of dissimilar densities. While these portions are illustrated as being approximately equal, they may be made in any size desired to provide narrower or wider central portions by the same principle. This product, as well as the one of FIGURE 6, is formed by the method illustrated in FIGURE 3 in which dissimilar latices are applied in the different portions. In this form of the invention barrier rows are located in the manner illustrated by the corings 39 so that there are two sets of these barrier rows adjacent to each other transversely of the mold. As before, each of these rows will have more closely spaced pins separated by normal spacing opposite the adjacent row which has the reverse arrangement so that the latices upon flow will be prevented from flowing further by the closely spaced barrier pins and thus will achieve the sinusoidal effect which is illustrated.

Still another form of the invention is illustrated in FIGURE 8 in which the same concept of pin location and latex flow is utilized to form a finished product 40 having a central portion 41 and longitudinal edge portions 42 and 43. The relationship of these portions with the corings 44 is illustrated in FIGURE 8 and is achieved in the manner described above. This form of the invention has utility in which it is desired to reinforce the longitudinal edges only of the article and where it is not desired to reinforce the transverse edges.

Referring again to FIGURE 4, it is noted that the principal portion 28 and the portion 26 do not have the same area or width on the upper and lower surfaces. This relationship is created by the arrangement of the core pins as described above, since the pins in the upper mold member are not in alignment with those in the lower member. As the latices flow against the closely spaced barrier pins, therefore, the maximum area of the portion 28 is greater on the upper face and decreases to a minimum on the lower face as shown. The peripheral portion 26, of course, will have the reverse relationship. The same arrangement of dissimilar areas of the same potrion on different faces will also exist with respect to the articles shown in FIGURES 6, 7, and 8 if the same arrangement of core pins is used. Of course, it should be understood that it is not necessary to utilize such an arrangement, and that if desired, the core pins may be directly opposite each other to produce corings which are also opposite each other.

In FIGURES 4 to 8 it is noted that cross hatching has been used to designate portions having dissimilar densities. It should be noted that the finished product, however, is unitary and will not have distinct portions as far as the user is concerned. The cross hatching shown is merely for the purpose of setting forth the features of the invention.

In addition to the specific forms of the invention described above, other arrangements are possible in which finished products having dissimilar densities may be fabricated. These products have portions which are mated along the generally sinusoidal planes illustrated. It is further noted that applicants do not intend to be limited to the exact arrangement of core pins or corings shown, but that other relationships are possible in order to achieve the same effect. For example, instead of three closely spaced pins four or more may be utilized.

We claim:
1. A molded unitary foam rubber article having flat rectangular upper and lower faces and a uniform thickness, said article composed of portions of dissimilar densities at right angles to said faces, the mating surfaces of said portions being contiguous along generally sinusoidal planes.
2. The article of claim 1 in which one of said portions has a density of approximately 0.06 gram per cubic centimeter, and the remaining portions have a density of approximately 0.09 grams per cubic centimeter.
3. The article of claim 1 comprising two longitudinal halves, each having dissimilar densities.
4. The article of claim 1 comprising three transverse portions, the central of said portions having a density which is different from that of the other portions.
5. The article of claim 1 comprising a central longitudinal portion and two longitudinal edge portions, said central portion having a density which is different from that of said edge portions.
6. The article of claim 1 comprising a central portion and an outer peripheral edge portion, said central portion having a density dissimilar from the density of said outer peripheral edge portion.
7. A molded unitary foam rubber article having flat upper and lower faces with spaced corings extending inwardly therefrom, said corings aligned in rows, at least two adjacent of said rows having corings more closely spaced than the other of said rows.
8. A molded unitary foam rubber article having flat upper and lower faces with spaced corings extending inwardly therefrom, said corings aligned in rows, at least one row having normally spaced corings and more closely spaced corings, and an adjacent row also having normally spaced corings and more closely spaced corings, the more closely spaced corings of said one row opposite the normally spaced corings of said adjacent row.
9. The article of claim 8 in which said article is composed of portions of dissimilar densities, the mating surfaces of said portions located between said adjacent rows.
10. The article of claim 9 in which said mating surfaces are contiguous along generally sinusoidal planes, the peaks of said planes being adjacent said more closely spaced corings of each of said rows.

References Cited by the Examiner
UNITED STATES PATENTS

| | | | |
|---|---|---|---|
| 1,872,846 | 8/1932 | Thiele | 5—361 |
| 2,180,304 | 11/1939 | Minor | 264—46 |
| 2,878,153 | 3/1959 | Hacklander | 264—46 |
| 3,009,172 | 11/1961 | Eidan | 5—338 |
| 3,026,544 | 3/1962 | Persicke et al. | 5—361 |
| 3,028,610 | 4/1962 | Talalay | 5—361 |
| 3,070,402 | 11/1962 | Stanton | 5—345 |
| 3,118,153 | 1/1964 | Hood | 5—345 |
| 3,133,853 | 5/1964 | Knox | 5—361 |
| 3,161,436 | 12/1964 | Hood | 297—460 |

FRANK B. SHERRY, *Primary Examiner.*

C. A. NUNBERG, *Assistant Examiner.*